tion, Copyright 1998.

(12) United States Patent
Levy

(10) Patent No.: US 7,725,937 B1
(45) Date of Patent: May 25, 2010

(54) CAPTURING A SECURITY BREACH

(75) Inventor: Elias Levy, San Francisco, CA (US)

(73) Assignee: Symantec Corporation, Cupertino, CA (US)

(\*) Notice: Subject to any disclaimer, the term of this patent is extended or adjusted under 35 U.S.C. 154(b) by 1166 days.

(21) Appl. No.: 10/775,764

(22) Filed: Feb. 9, 2004

(51) Int. Cl.
*G06F 12/14* (2006.01)
*G06F 11/00* (2006.01)

(52) U.S. Cl. .................. 726/23; 726/22; 713/187; 713/188

(58) Field of Classification Search .......... 726/22, 726/23; 713/187, 188
See application file for complete search history.

(56) References Cited

U.S. PATENT DOCUMENTS

| 2003/0110396 | A1* | 6/2003 | Lewis et al. ........... 713/201 |
| 2004/0078592 | A1* | 4/2004 | Fagone et al. .......... 713/201 |
| 2004/0128543 | A1* | 7/2004 | Blake et al. ........... 713/201 |
| 2004/0139128 | A1* | 7/2004 | Becker et al. .......... 707/204 |
| 2005/0108415 | A1* | 5/2005 | Turk et al. ............ 709/232 |
| 2005/0132367 | A1* | 6/2005 | Tewari et al. ............ 718/1 |

OTHER PUBLICATIONS

The Honeynet Project, INFOCUS; Know Your Enemy: Building Virtual Honeynets; Aug. 20, 2002; SecurityFocus.com.*
Analysis of a Compromised Honeypot on Cable Modem, Matthew Schlereth, Jan. 17, 2003, pp. 21-24, http://citeseer.ist.psu.edu/cache/papers/cs/30911/http:zSzzSzwww.giac.orgzSzpracticalzSzGCFAzSzMatthew_Schlereth_GCFA.pdf/schlereth03analysis.pdf.*
ManTrap: A Secure Deception System, Copyright Recourse Technologies, Inc. 2001.
Fred Cohen, A Note on the Role of Deception in Information Protection, Copyright 1998.
Networks Associates Technology, Inc., CyberCop Sting Getting Started Guide Version 1.0, Copyright 1999, Issued May 1999.
Honeynet Project, INFOCUS; Know Your Enemy: Honeynets; Apr. 26, 2001; SecurityFocus.com.

\* cited by examiner

*Primary Examiner*—Christopher J Brown
(74) *Attorney, Agent, or Firm*—Hunton & Williams LLP

(57) ABSTRACT

A technique is disclosed for capturing a security breach. In one embodiment, the technique comprises initially deploying a honey pot; detecting a breach of the honey pot; and automatically redeploying the honey pot.

17 Claims, 8 Drawing Sheets

CAPTURING A SECURITY BREACH

FIELD OF THE INVENTION

The present invention relates generally to computer environments. More specifically, a technique for capturing a security breach is disclosed.

BACKGROUND OF THE INVENTION

Today's computer systems are subject to breaches by malicious code, such as computer viruses and worms. Early detection and capture of such breaches would be beneficial as this data can be analyzed and used to protect a computer system from future attacks. There are several ways that can be used to capture a security breach. A user can submit malicious code samples after the user's computer has been attacked. A problem with this method is that the user's system is already breached with possibly severe consequences. Another way to obtain information about a potential attack is to obtain sample code from sharing groups. However, this kind of information can be unreliable. Yet another way of obtaining information is via a honey pot.

Honey pots are computer programs or systems that are meant to be breached for the purpose of capturing information associated with the breach. Such information can then typically be analyzed in an attempt to understand and prevent future attacks. Types of honey pots can include synthetic honey pots and sacrificial honey pots. Synthetic honey pots emulate services which can be attacked, and are typically easy to deploy and manage. However, synthetic honey pots can be development intensive and typically do not fully emulate a real system. Sacrificial honey pots can be actual computer systems, permitting the honey pot to capture attacks that may occur in a real environment. However, a sacrificial honey pot can take a significant amount of time to set up and manage. For example, once a honey pot is breached, analysis and subsequent redeployment of the honey pot are typically performed manually. Thus, it would be desirable to have a technique for capturing a security breach that is efficient to deploy and manage.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

In some embodiments, when a honey pot is breached, the honey pot is automatically redeployed and the breach is automatically analyzed. A network address translation can be used in some embodiments to increase the network footprint associated with the honey pot.

Figure 1A:
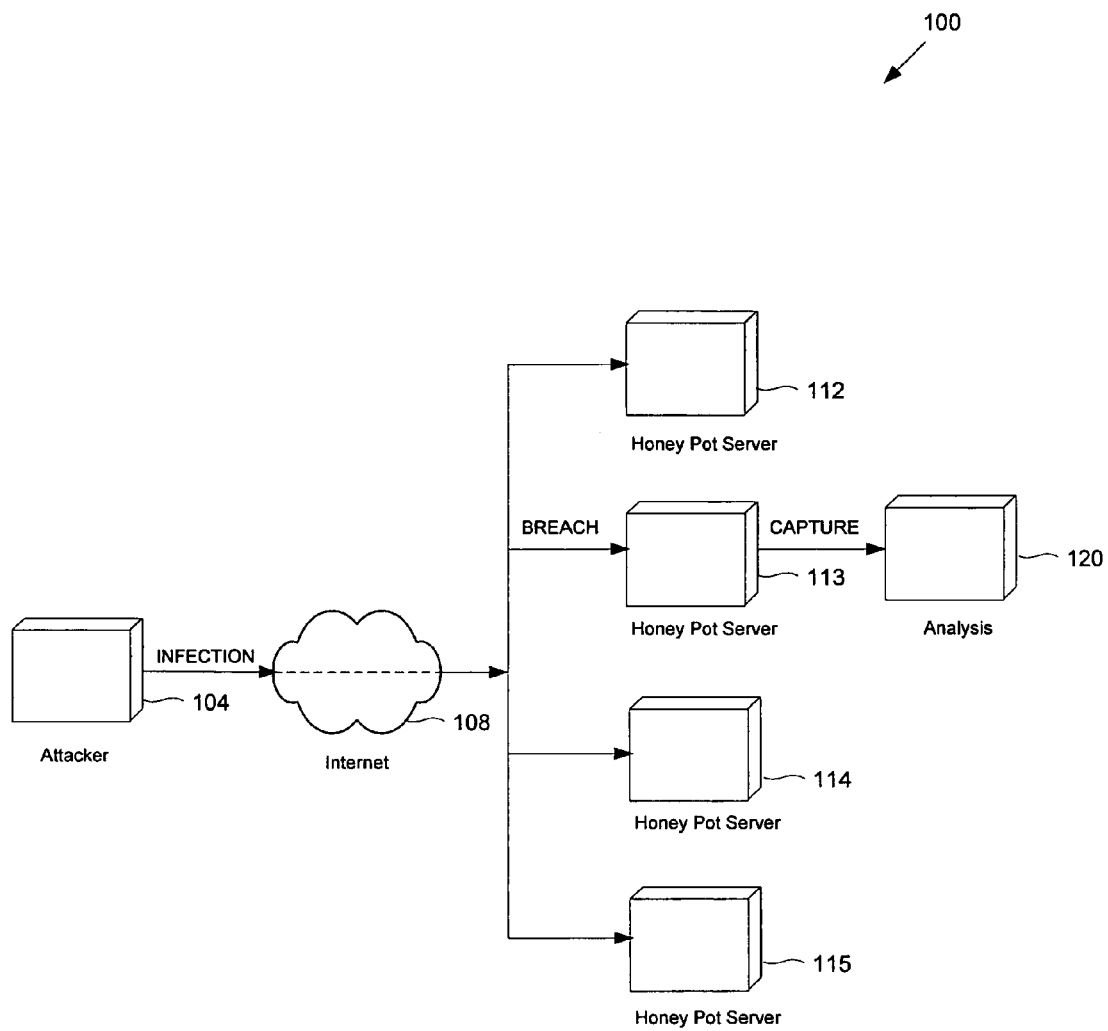
FIGS. 1A-1B are block diagrams of techniques used in some embodiments for capturing a security breach.

FIG. 1A is a block diagram of a technique used in one embodiment for capturing a security breach. In this example, technique 100 is shown to include attacker 104, Internet 108, honey pots 112-115, and analysis 120. A honey pot, as used herein, can include any physical or virtual computer system, computer program, or network meant to be breached for the purpose of capturing information associated with the breach. Such information can include code samples, monitoring data, or any other information associated with the breach. This information can then be analyzed to prevent future attacks. Attacker 104 can be any computer system or program designed to attack other computer systems over a network. For example, attacker 104 can send a virus embedded in an email message over Internet 108 to breach honey pot 113. The breach can be automatically detected and analyzed. For example, analysis 120 is shown to analyze any captured security breach from honey pot server 113. The honey pot can be automatically redeployed.

Figure 1B:
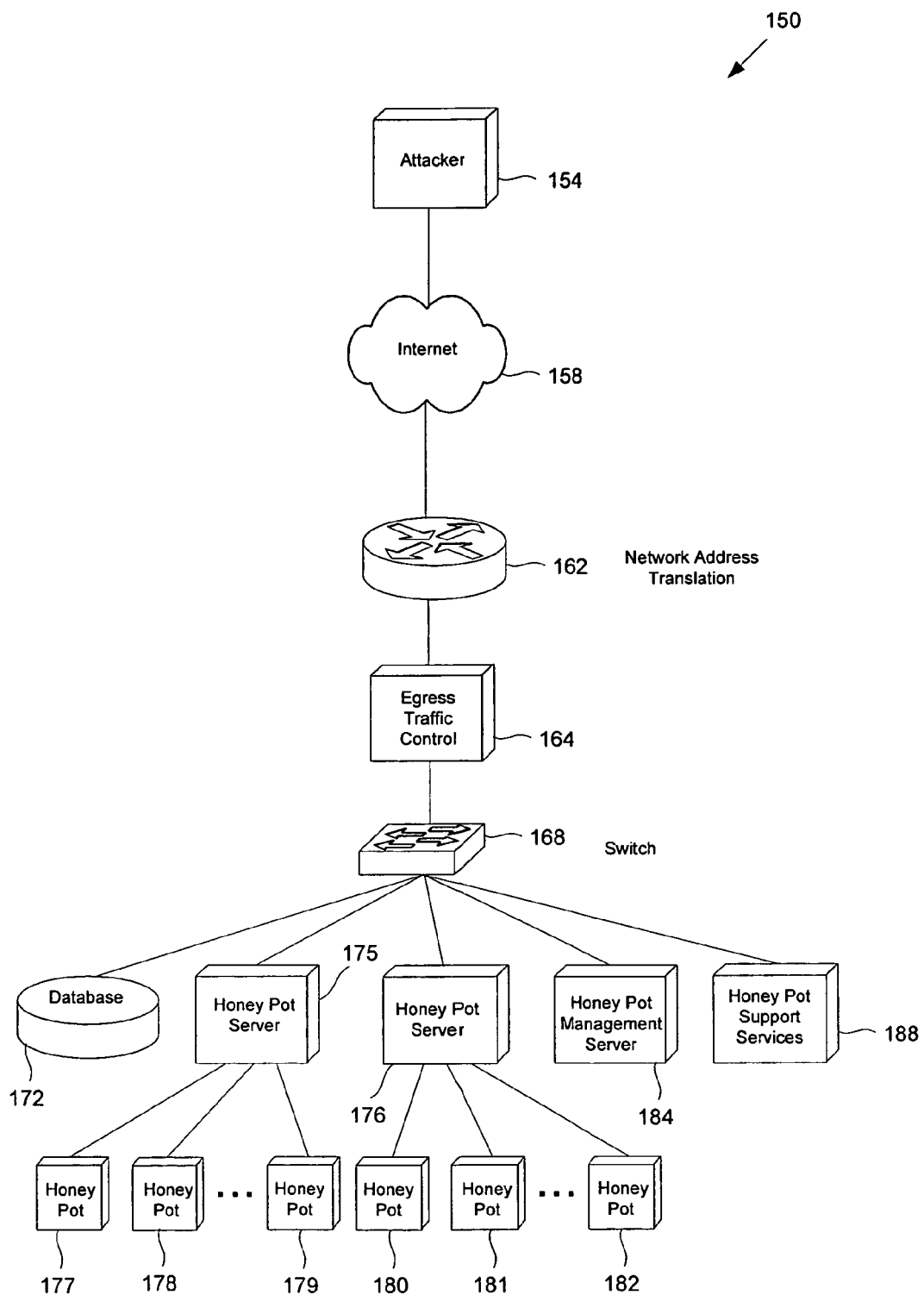

FIG. 1B is a block diagram of a technique used in one embodiment for capturing a security breach. In this example, technique 150 is shown to include attacker 154, Internet 158, network address translation (NAT) 162, egress traffic control 164, switch 168, database 172, honey pot server 175, honey pot server 176, honey pot management server 184, and honey pot support services 188. Honey pots 177-179 and honey pots 180-182 are virtual honey pots running on honey pot server 175 and honey pot server 176, respectively. As used herein, a virtual honey pot includes a virtual machine functioning as a honey pot. Multiple virtual honey pots can be deployed on a single server. For example, a VMWARE server can run several virtual machines as honey pots. Each virtual honey pot can run any operating system and any number of applications.

A virtual honey pot can be handled programmatically, which can facilitate automated management of the honey pot in some embodiments. Technique 150 is shown to include two honey pot servers each running a plurality of virtual honey pots. However, any number of honey pot servers and any number of honey pots can be included. In some embodiments, physical honey pots or a combination of physical and virtual honey pots are used. As used herein, a physical honey pot is a physical machine functioning as a honey pot.

Each of honey pot servers 175-176 may include a management and monitoring subsystem, a data capture subsystem, and a network access control subsystem. The management and monitoring subsystem starts new honey pot instances as needed, determines when honey pots have been breached, shuts down honey pot instances, and submits captured data to automated post-intrusion analysis. The data capture subsystem captures all network data to and from a honey pot instance, and can capture data from within the honey pot instance itself if properly instrumented. The network access control subsystem drops spoofed packets from honey pot instances, cross-honey pot traffic, traffic from a honey pot to the support systems, and traffic from a honey pot to high-risk port numbers, while also performing rate limiting of outgoing honey pot traffic. All of this can be done programmatically, for example, using VMWARE APIs.

NAT 162 can map a multitude of routable IP addresses to a smaller number of honey pots. This increases the number of routable IP addresses associated with the honey pots without having to increase the actual number of honey pots. The larger network footprint increases the chances of an attack on a honey pot.

Egress traffic control 164 can prevent outgoing network attacks that may be initiated by breached honey pots. Various methods can be used. For example, outgoing connections that match known attack signatures can be dropped. Alternatively, the number of outgoing connections can be limited to a certain number.

Honey pot support services 188 can provide various services to honey pots, such as DHCP service and DNS service.

Honey pot management server 184 may include a post-intrusion automated analysis subsystem that extracts files that may be associated with malicious code, such as new or modified files from a honey pot's file system. These files can be human or machine analyzed in multiple ways, depending on the goals of the user. One example of a tool that can be used for analysis is the Symantec Digital Immune System (DIS), as described in U.S. Pat. No. 5,440,723. The subsystem can analyze captured honey pot data to detect known network based attacks, extract network flow data, and perform other analysis. Operators can configure and manage the system and access captured data using a web-based interface. For example, the web-based interface can be used to configure the following: 10 WINDOWS NT honey pots; 5 WINDOWS 2000 honey pots; and 2 Linux honey pots.

Database 172 can be used for data storage. In some embodiments, database 172 is co-located with one of devices 175, 176, 184, or 188. Likewise, devices 172, 175, 176, 184, and 188 can be located on one physical machine or distributed among a plurality of physical machines.

Figure 2:
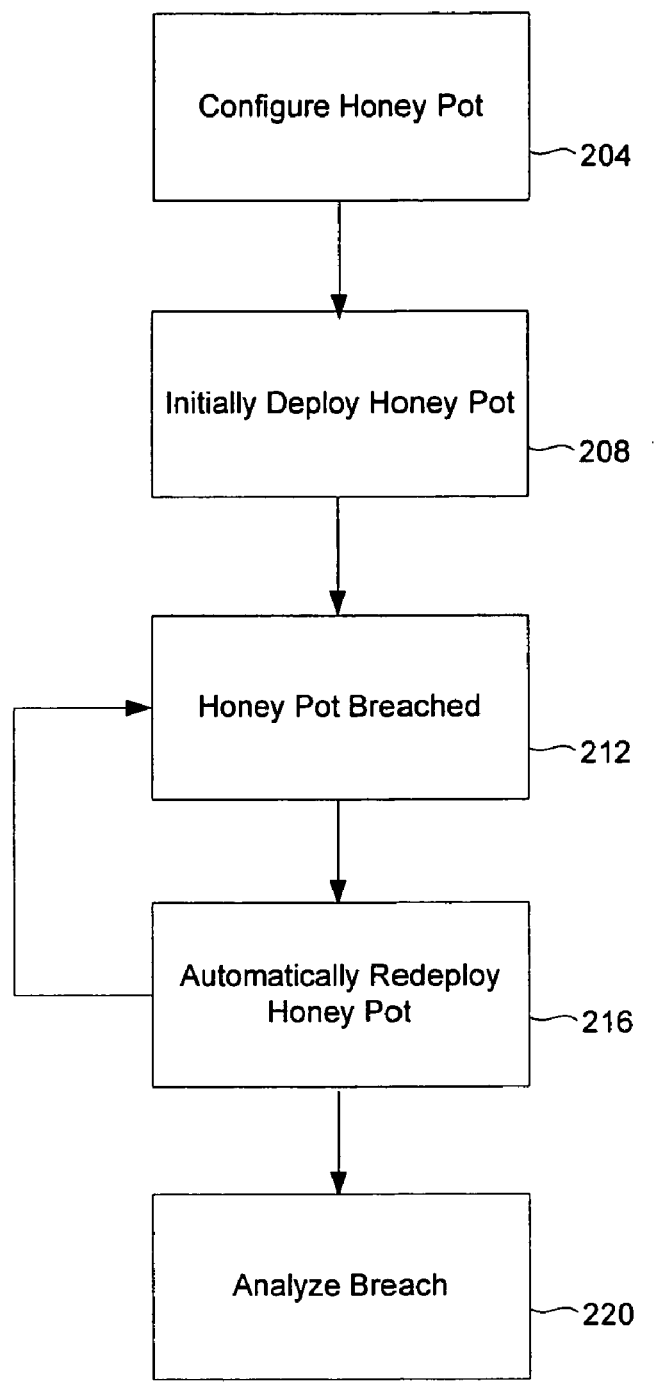
FIG. 2 is a flowchart of a technique used in one embodiment for capturing a security breach.

FIG. 2 is a flowchart of a technique used in one embodiment for capturing a security breach. FIG. 2 is followed by FIGS. 3A, 3B, and 3C, which provide further examples. In this example, a virtual sacrificial honey pot is discussed; however, this example can be applied to any other type of honey pot, such as a sacrificial physical honey pot or synthetic virtual honey pot. One example of a synthetic virtual honey pot is a virtual machine that opens a network port and captures any traffic that passes through the port.

In this example, a honey pot is configured (204). The honey pot can be a virtual honey pot or a physical honey pot. Examples of virtualization software that can be used to create a virtual honey pot include MICROSOFT VIRTUAL PC, Bochs, and user mode Linux. The honey pot can be configured by manually installing an operating system and various applications on the honey pot. The honey pot is initially deployed (208). A physical honey pot can be deployed by connecting it to a network. A virtual honey pot can be deployed by virtualization software, such as VMWARE. For example, in FIG. 1B, honey pot 177 is shown as deployed on honey pot server 175. The honey pot continues running until it is breached (212). A breach can be automatically detected by monitoring outgoing network traffic from the honey pot. If a breach is detected, the honey pot's state can be copied to an analysis area. The honey pot is automatically redeployed (216) so that it can immediately become available for new incidents. This can be similar or different from initially deploying the honey pot. Redeploying the honey pot can include reinitializing the state of the honey pot. The breach is analyzed (220). The analysis can be automatic. Analysis can include aggregating the data collected by or against the honey pot, such as packet dumps and IDS events. Further analysis can be performed by mounting a virtual drive and flagging any file changes. The virtual drive can be scanned for known malicious code. This information can be put in a database, which can be made available to an analyzer. The analyzer can choose to discard an incident's state, archive it, or perform further analysis. Redeploying (216) and analyzing (220) can be performed in parallel for efficiency. Optionally, analyzing (220) can be performed before redeploying the honey pot (216).

Figure 3A:
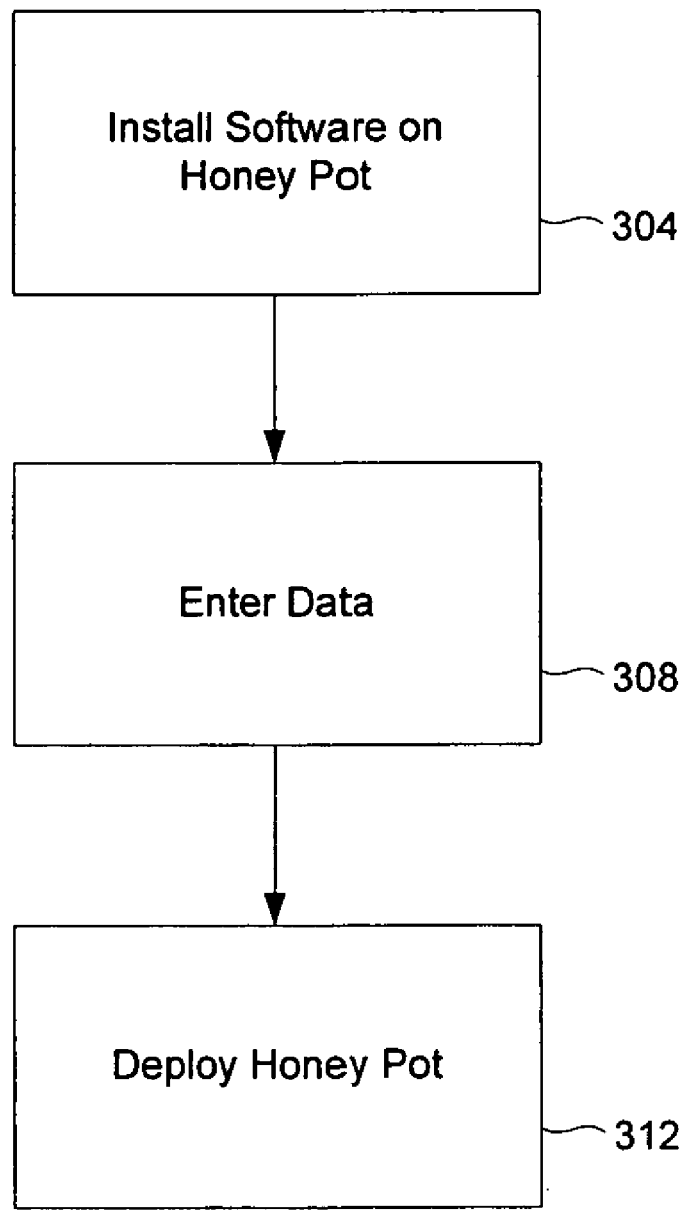
FIG. 3A is a flowchart of a technique used in one embodiment to configure a honey pot.

FIG. 3A is a flowchart of a technique used in one embodiment to configure a honey pot. This embodiment can be used in FIG. 2 to configure a honey pot (204). In this example, software is installed on the honey pot (304). Software can be installed to make the honey pot look like a typical user's machine. For example, in FIG. 1B, WINDOWS NT, Internet Explorer, and Microsoft Exchange can be installed on honey pot 177. This configuration could attract a Microsoft Exchange worm designed to corrupt WINDOWS NT machines. A different operating system and different applications can be installed on honey pots 178 and 179 to attract other types of attacks. In the case of a virtual honey pot, the choice of operating systems may depend on what the virtualization software can support. An image, or master honey pot, can be created, to facilitate configuring a plurality of honey pots to run the same or similar software. For example, an image can be created that runs Linux and a particular set of applications. Multiple honey pots can then be copied from that image. Data is entered (308). For example, file system information can be entered. The number of honey pots to run for a particular image can be specified. For example, 10 honey pots can run on one particular image. Any number of honey pots can be run, depending on available resources. Information about how to handle the honey pot can be entered. The honey pot is deployed (312).

Figure 3B:
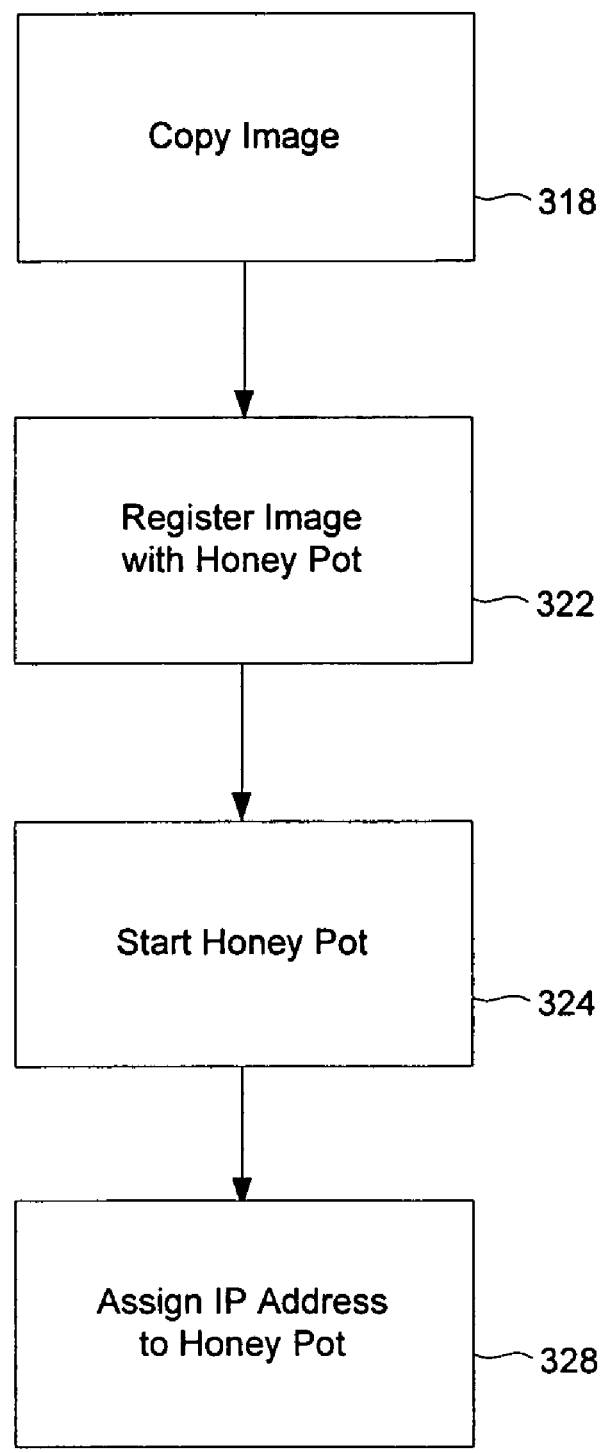
FIG. 3B is a flowchart of a technique used in one embodiment to initially deploy a honey pot.

FIG. 3B is a flowchart of a technique used in one embodiment to initially deploy a honey pot. This embodiment can be used in FIG. 2 to initially deploy a honey pot (208). In this example, an image is copied (318). For example, an image created during configuration of the honey pot can be copied, as described above. The image is registered with a honey pot (322). For example, the image can be registered with a virtual machine, such as a VMWARE virtual machine. The honey pot is started (324). For example, a VMWARE virtual machine can be instructed to start the honey pot. The configured operating system boots up and the configured applications start running. An internal IP address is assigned to the honey pot (328). For example, in FIG. 1A, a DHCP service provided by honey pot support service 188 can assign the IP address.

Figure 3C:
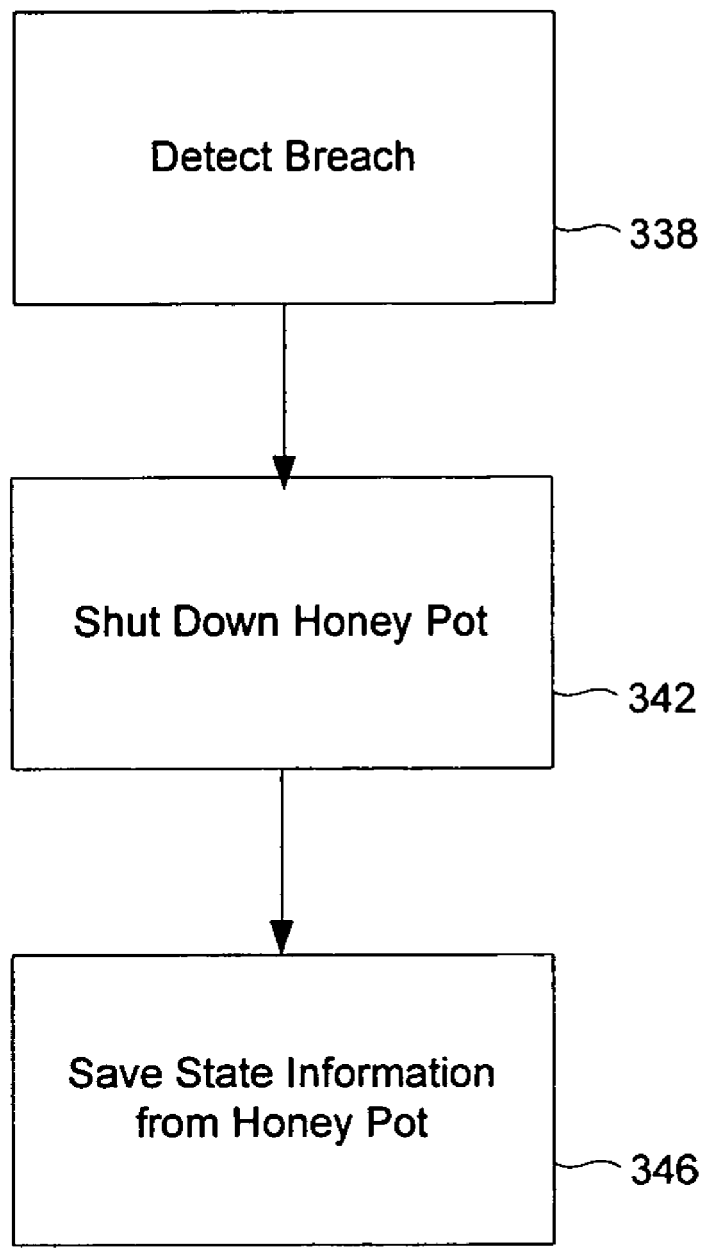
FIG. 3C is a flowchart of a technique used in one embodiment when a honey pot is breached.
Figure 4:
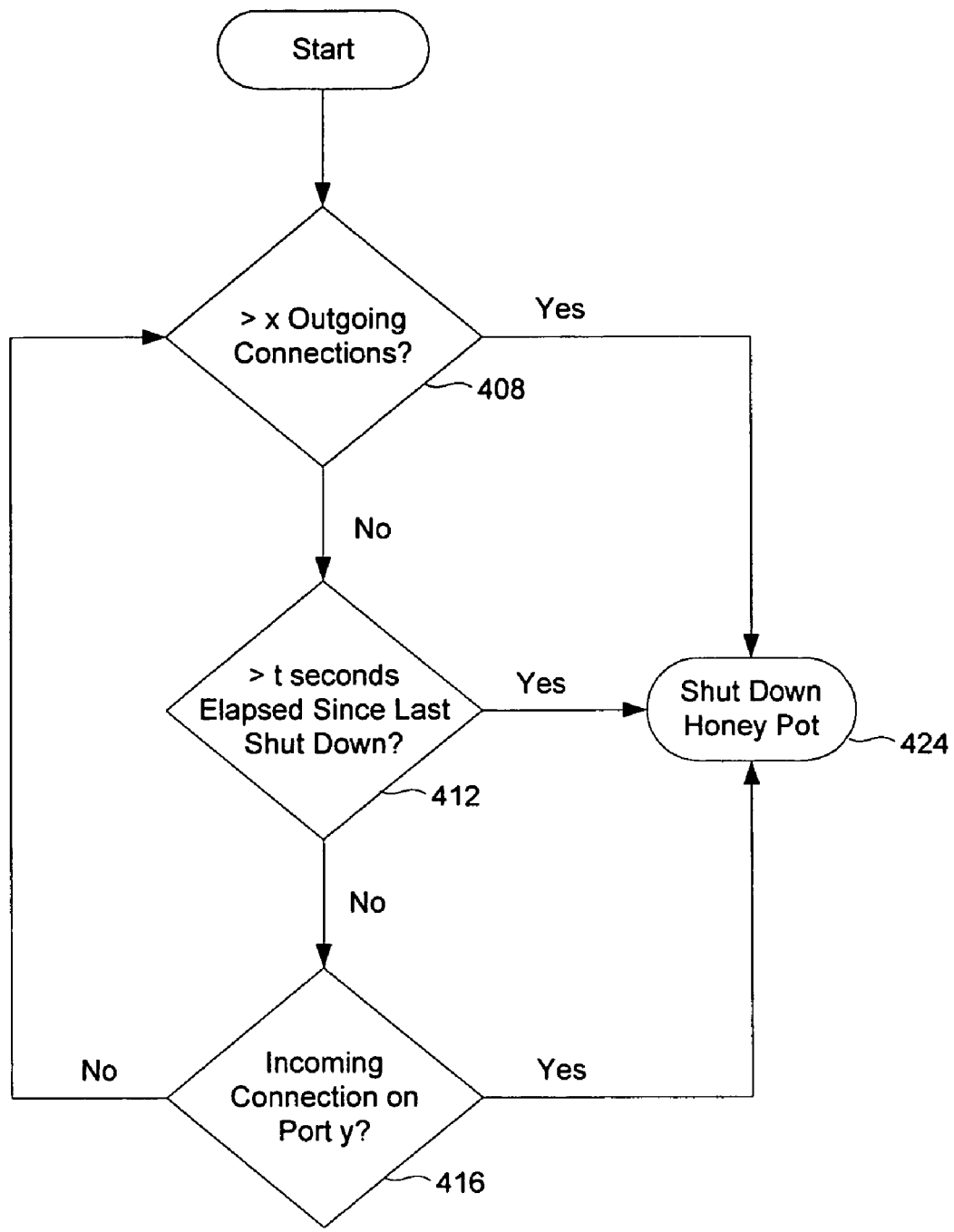
FIG. 4 is a flowchart of a technique used in one embodiment to detect a breach of a honey pot.

FIG. 3C is a flowchart of a technique used in one embodiment when a honey pot is breached. This embodiment can be used in FIG. 2 (212). In this example, a breach is detected (338). The breach can be detected using any appropriate method. The breach can be detected automatically. Rules can be set for detecting a breach. For example, suspicious events can be defined and if a suspicious event occurs, it is assumed a breach occurs. An outgoing or incoming connection can be monitored and if the number of connections exceeds a certain number, a breach is assumed. Another example is shown in FIG. 4. The honey pot is shut down (342). There may be a wait before the honey pot is shut down. For example, if the system is listening on a port, and a connection comes in, it may be desirable to wait a certain period to capture additional information associated with the breach. Additional information can include other components that may be downloaded to the honey pot subsequent to initial detection of the breach. State information from the honey pot is saved (346). This can include making a copy of the disk image and any network traffic associated with the honey pot. In some embodiments, while state information is copied, a new honey pot is deployed so that the honey pot can immediately become available for new attacks.

The state information can be analyzed. The analysis can be automatically performed as soon as the state information from the honey pot is saved. Any appropriate machine and/or human based analysis can be performed. Analysis can include file extraction, such as extracting new or modified files that may have been created during the breach. The state information can be placed in a database, such as database 172 in FIG. 1B. A user can browse the database and choose to discard an incident's state, archive it, or perform further analysis. A program such as DIS can generate a signature based on sample code. The signature can then be provided to an antivirus product. If DIS fails to generate a signature, the analysis can be passed to a human.

FIG. 4 is a flowchart of a technique used in one embodiment to detect a breach of a honey pot. This embodiment can be used in FIG. 3C to detect a breach (338). In this example, it is determined whether there are greater than x outgoing connections (408). A large number of outgoing connections may indicate that a breach has occurred. If there are at least x outgoing connections, the honey pot is shut down (424). If there are fewer than x outgoing connections, it is determined whether t seconds have elapsed since the last shut down (412). For example, there may be cases where the system is breached but doesn't make outgoing connections. It may be possible that a breach has taken place after a long period of time, such as a day. If t seconds have elapsed since the last shut down, the honey pot is shut down (424). If t seconds have not elapsed since the last shut down, it is determined whether there is an incoming connection on port y (416). Port y can be any other port associated with the honey pot. If there is an incoming connection on port y, the honey pot is shut down (424). If there isn't an incoming connection on port y, the loop is repeated until a breach is detected. Before shutting down, there may be a wait period in order to capture additional information related to the breach.

Figure 5:
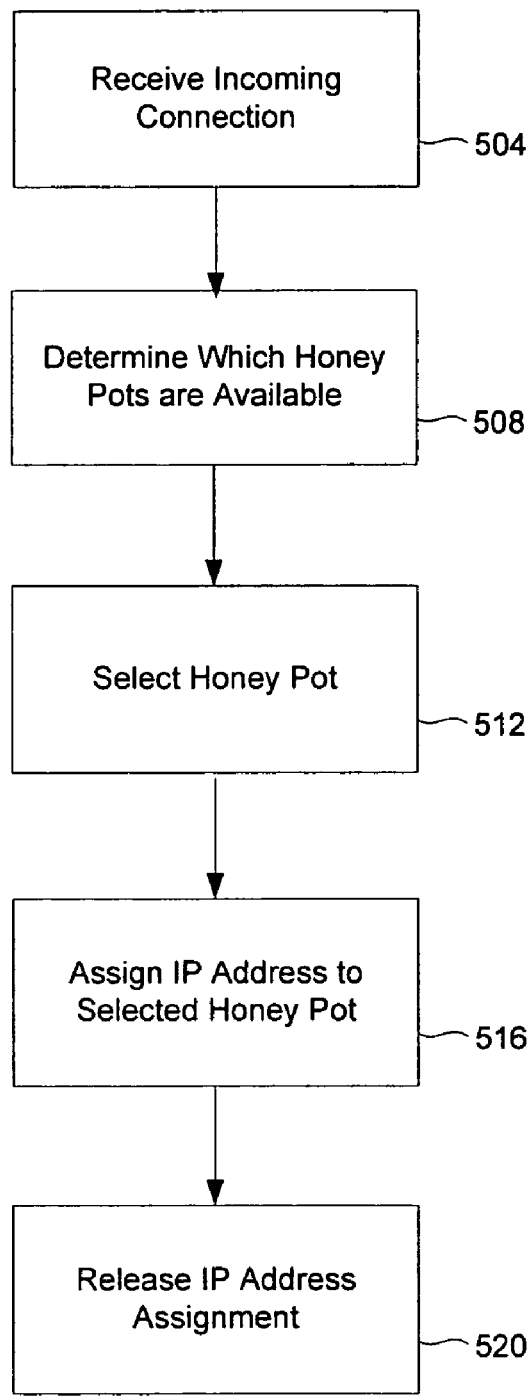
FIG. 5 is a flowchart of a technique used in one embodiment to map an external IP address to a honey pot.

FIG. 5 is a flowchart of a technique used in one embodiment to map an external IP address to a honey pot. In some embodiments, NAT 162 in FIG. 1B maps the IP address according to this example. In this example, M external IP addresses is mapped to N internal IP addresses each associated with a honey pot. If M is much greater than N, a large IP address space can be mapped to a smaller IP address space. This may be desirable because network-based worms and opportunistic attackers commonly select a networked system to attack by either randomly generating a target IP address or randomly selecting a network and scanning a target network. In both cases, the chances of the system being selected as a target for an attack increases with the size of the IP address space.

In this example, an incoming connection associated with an IP address is received (504). It is determined which honey pots are available (508). Some honey pots may already have been mapped an IP address based on a previous request. A honey pot is selected (512). Any available honey pot may be selected. The selection can be based on any appropriate method, such as randomly selecting an available honey pot. The selection can be based on information associated with the connection, such as the requested TCP or UDP port numbers. For example, if port 80 is requested, a honey pot running a web server could be selected.

The IP address is mapped to the selected honey pot (520). The IP address mapping is released when appropriate (520). For example, the IP address mapping may be released when it appears that the connection is no longer needed or after the connection has been running for a certain period of time. The honey pot is then available to be mapped to the next incoming IP address.

The examples above can be applied to any type of honey pot, including physical or virtual honey pots. A physical honey pot might include re-imaging after each breach or booting from the network and mounting a disk from a honey pot management system, such as honey pot management server 184 in FIG. 1B. A physical honey pot may support some environments not supported by virtualization software. For instance, a virtualization software package may only support an operating system that executes in the Intel IA-32 (x86) architecture.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of capturing a security breach, comprising:
deploying a honey pot server comprising a honey pot;
using a processor to detect a breach of the honey pot, wherein the breach indicates the honey pot has been compromised;
using the processor to capture a state of the honey pot, including by creating a copy of data associated with the honey pot as compromised; and
using the processor to automatically redeploy the honey pot, including by reinitializing the state of the honey pot to an initial state in which the honey pot was in at the time it was deployed; and
wherein deploying the honey pot comprises registering with a virtual machine instance an initialization image associated with the initial state and instructing the virtual machine instance to execute the image, the image comprising data usable by the virtual machine to provide a virtual environment having a running instance of an operating system and one or more applications or other programs running on the operating system instance, and wherein redeploying the honey pot includes using the image to reset the virtual machine instance to the initial state.

2. The method of claim 1, further including analyzing the breach.

3. The method of claim 1, further including automatically analyzing the breach.

4. The method of claim 1, wherein the breach is automatically detected.

5. The method of claim 1, further including configuring the honey pot.

6. The method of claim 1, wherein capturing the state comprises copying a honey pot image.

7. The method of claim 1, wherein detecting is based on the number of outgoing connections detected.

8. The method of claim 1, wherein detecting is based on the number of incoming connections detected.

9. The method of claim 1, wherein detecting is based on an elapsed time.

10. The method of claim 1, wherein the honey pot runs a Linux operating system.

11. The method of claim 1, further including saving state information associated with the honey pot.

12. The method of claim 1, further including saving state information associated with the honey pot and wherein saving and redeploying occur in parallel.

13. The method of claim 1, further including analyzing the breach and wherein analyzing and redeploying occur in parallel.

14. The method of claim 1, further including:
   receiving an incoming connection associated with an IP address;
   mapping the IP address to the honey pot; and
   releasing the IP address mapping.

15. The method of claim 1, further including:
   receiving an incoming connection associated with an IP address;
   mapping the IP address to the honey pot;
   releasing the IP address mapping; and
   mapping another IP address to the honey pot.

16. A computer program product for capturing a security breach, the computer program product being embodied in a computer readable storage medium and comprising computer instructions for:
   deploying a honey pot;
   detecting a breach of the honey pot, wherein the breach indicates the honey pot has been compromised;
   capturing a state of the honey pot, including by creating a copy of data associated with the honey pot as compromised; and
   automatically redeploying the honey pot, including by reinitializing the state of the honey pot to an initial state in which the honey pot was in at the time it was deployed; and
   wherein deploying the honey pot comprises registering with a virtual machine instance an initialization image associated with the initial state and instructing the virtual machine instance to execute the image, the image comprising data usable by the virtual machine to provide a virtual environment having a running instance of an operating system and one or more applications or other programs running on the operating system instance, and wherein redeploying the honey pot includes using the image to reset the virtual machine instance to the initial state.

17. A system for capturing a security breach, comprising:
   a processor configured to:
      deploy a honey pot;
      detect a breach of the honey pot, wherein the breach indicates the honey pot has been compromised;
      capture a state of the honey pot, including by creating a copy of data associated with the honey pot as compromised; and
      automatically redeploy the honey pot, including by reinitializing the state of the honey pot to an initial state in which the honey pot was in at the time it was deployed; and
   a memory coupled with the processor, wherein the memory provides the processor with instructions;
   wherein the processor is configured to deploy the honey pot at least in part by registering with a virtual machine instance an initialization image associated with the initial state and instructing the virtual machine instance to execute the image, the image comprising data usable by the virtual machine to provide a virtual environment having a running instance of an operating system and one or more applications or other programs running on the operating system instance, and wherein redeploying the honey pot includes using the image to reset the virtual machine instance to the initial state.

* * * * *